United States Patent [19]

Halpin et al.

[11] 4,356,030

[45] Oct. 26, 1982

[54] SAFE DISPOSAL OF METAL VALUES IN SLAG

[75] Inventors: Peter T. Halpin, McLean; George L. Zarur, Springfield, both of Va.

[73] Assignee: World Resources Company, McLean, Va.

[21] Appl. No.: 240,057

[22] Filed: Mar. 3, 1981

[51] Int. Cl.³ .............................................. C22B 9/00
[52] U.S. Cl. ................................. 75/21; 75/74; 75/77; 75/82; 75/85; 75/86; 75/68 R; 75/30; 75/7; 75/83; 75/92
[58] Field of Search ................... 75/7, 21, 8, 30, 85, 75/86, 77, 78, 79, 83, 82, 72, 74; 110/238

[56] References Cited

U.S. PATENT DOCUMENTS

| | | | |
|---|---|---|---|
| 2,111,789 | 3/1938 | Kuzell | 75/21 |
| 3,351,462 | 11/1967 | Arentzen et al. | 75/74 |
| 4,033,763 | 7/1977 | Markels | 75/97 R |
| 4,110,212 | 8/1978 | Krofchak | 210/53 |
| 4,120,698 | 10/1978 | Atchinson et al. | 75/82 |
| 4,154,607 | 5/1979 | Wikman et al. | 75/77 |
| 4,188,892 | 2/1980 | Kiefer et al. | 110/238 |
| 4,202,792 | 5/1980 | Kaufmann et al. | 252/301.1 W |

FOREIGN PATENT DOCUMENTS 1396205 6/1975 United Kingdom .

OTHER PUBLICATIONS

Article: Recycling of Incinerator Ash, Research report 19, Diosady Ontario Ministry of the Environment, 135 St. Clair Ave., West, Toronto, Canada, pp. i, iii, iv, v, vi, vii, viii, (1975).

Battelle Memorial Institute, Pac. N.W. Laboratories, Richland, Wash., BNWL #1541, Jan. 1971, pp. 3.1, 3.2, 3.5, 3.8, 3.10, 3.12 and 3.15.

Primary Examiner—L. Dewayne Rutledge
Assistant Examiner—Christopher W. Brody
Attorney, Agent, or Firm—Dowell & Dowell

[57] ABSTRACT

The method of safely disposing of sludge containing metal values capable of displaying toxic ecological properties including the steps of deriving from an organic or inorganic sludge an intermediate product such as a dewatered sludge or an incinerated ash, and adding this intermediate product to a metal smelting step of a type producing a slag such that most of the metal values become encapsulated in the slag, although some precious metal values may be recovered with the metal being smelted, and may be subsequently separated therefrom by appropriate metal winning steps, the sludge product bringing to the smelting process certain additives needed therein such as silica and phosphates for the slag, alumina and magnesium to lower the viscosity of the molten slag, and organic matter serving as reducing agents.

10 Claims, 5 Drawing Figures

TYPICAL ANALYSES IN COPPER SMELTING (%)

|  | Cu | Pb | Zn | Fe | $Al_2O_3$ | CaO | MgO | $SiO_2$ | $Fe_3O_4$ |
|---|---|---|---|---|---|---|---|---|---|
| ORE | 25 | .5 | 1. | 24. | 3. | 3.5 | .7 | 8 | |
| SILICA | | | | | 3. | 6. | 1. | .2 | 80. |
| SLAG | .5 | .2 | 1.5 | 34. | 7.5 | 5.5 | 1.5 | 37. | 3.5 |

TYPICAL ANALYSES OF INCINERATOR ASH (%)

| Cu | Pb | Zn | Fe  | Al  | Ca  | Mg  | Si  | P   | Ti  | Ag | Au |
|----|----|----|-----|-----|-----|-----|-----|-----|-----|----|----|
| .4 | .1 | .7 | 5.  | 11  | 4.5 | 1.6 | 21. | 4.  | 1.5 | *  | *  |
| .1 | —  | —  | 4.4 | 4.5 | 20. | 1.5 | 11. | 3.  | .5  | *  | *  |
| —  | —  | —  | 2.5 | .2  | 34. | 3.  | 1.  | 3.  | .03 | *  | *  |
| .2 | .2 | .3 | 3.1 | 6.  | 22. | 2.8 | 5.4 | 7.2 | .4  | *  | *  |
| .2 | .2 | .3 | 2.7 | 8.  | 3.1 | 2.0 | 16. | 11. | 5.  | *  | *  |

TYPICAL ANALYSES OF INDUSTRIAL SLUDGE (%)

| Si | Al | Fe  | Ca  | Mg  | Cu  | Na  | Cr | Ti  | K  | Ba | Sn  | P   | N   | Mn  | Pb | Zn | Cd | Ag | Au |
|----|----|-----|-----|-----|-----|-----|----|-----|----|----|-----|-----|-----|-----|----|----|----|----|----|
| 20 | 12 | 3   | 6.8 | 1.8 | 1.2 | 2.9 | .6 | .5  | —  | —  | 1.0 | 1.1 | 1.9 | —   | .1 | .3 | —  | *  | *  |
| 15 | 4  | 9.2 | 9.3 | .7  | 1.9 | 1.4 | .3 | 1.1 | .5 | .4 | .6  | 1.4 | 1.4 | .3  | .1 | .2 | .1 | *  | *  |

SAFE DISPOSAL OF METAL VALUES IN SLAG

BACKGROUND AND PRIOR ART

The safe disposal of hazardous metal values has long been recognized as a serious problem, particularly with regard to industrial waste sludges. It is now becoming apparent that the incineration of organic sludges, such as sewage sludge, can increase the toxic nature of included metal values, which also present a disposal problem. The hazardous nature of incinerated ash is attributable, not to the components of the ash which are present in large concentration such as phosphates, silica, alumina and lime, but rather are attributable to metal values which appear as minor components in the original organic sludge. Some of these metal values tend to appear initially in less toxic forms which are, however, converted into more toxic forms by the incineration heat. For instance, trivalent chromium is changed to hexavalent chromium by incineration, and hexavalent chromium is very toxic. Of course, there are other toxic metals present, such as cadmium, lead, mercury, nickel and arsenic. It is therefore important to find a way of disposing of both organic sludge and inorganic industrial sludge in a way which will render these toxic metal values harmless. One such way is to encapsulate the toxic values in a smelting slag which makes them essentially inert for all practical purposes since the slag is not leached, for instance by rainwater. Ordinary incinerated ash when not thus encapsulated is not safely disposed of by land fill since the toxic values will be leached by rainwater, thereby poisoning the land and the aquifer.

There are many smelting processes which can be used to occlude toxic metals in a non-leaching slag. Moreover, the smelting processes themselves would be actively benefited by the addition thereto either of a dried sludge or an incinerated ash. Suitable processes include both smelting of a primary ore, and also scrap smelting. For instance, it is well-known that sewage sludge usually contains a very high silica content, a large proportion of lime, and a substantial amount of alumina or alkali earth metal such as magnesium. These are all ingredients which are deliberately added in many smelting processes, and which comprise fluxing reagents which must be purchased by the smelter. Another ingredient which often appears in high concentration in sewage sludges is phosphates, whose benefit to the slagging process will be discussed hereinafter. In the event that a dried sludge is added to the smelting process, it will introduce a substantial calorific value including organic carbon which can serve to replace some of the coke or coal or other reducing agent which is normally added to the ore during smelting, or if not needed for its reducing properties a sludge can still be added to the smelting process. Therefore, the addition of sludge or ash to such ore is beneficial both from the point of view of encapsulation of toxic metal values in the slag, and also from the point of view of supplying desirable reagents to the ore from the point of view of the smelter.

There are a number of different smelting processes to which the present invention can be applied, some of the more common of these including copper, lead, zinc, nickel, tin, iron, etc. The copper, lead, tin, nickel, and zinc processes are especially useful in cases where the sludge contains traces of precious metals, because these precious metals go into the matte together with the recovered metal during the smelting process rather than with the slag, whereby they are concentrated and become relatively easily recoverable by processes such as electrolytic plating as set forth in the prior art.

The smelting process generally has three steps, including an ore roasting step, a smelting step, and a converter step. During a typical copper ore roasting step, the ore is heated to a relatively lower temperature of 500° or 600° C. in order to drive off some of the sulfur in the ore as sulfur dioxide or hydrogen sulfide gases, the roasting step concluding when enough sulfur has been burned off so that sulphur remains in approximately the correct proportion required to prevent the formation of magnetite during the smelting step which follows. The rotating step also calcines calcium carbonate, changing it to calcium oxide. The smelting step is then carried out at a much higher temperature of 1100° to 1200° C., the ore being fluxed in order to adjust the proportions of silica and lime therein to form an optimum slag. Note that practical smelting temperatures are well above the minimum temperature required to form water insoluble slags, the minimum being about 775° C. During the smelting step, in the case of copper smelting, the sulfur is particularly useful for the purpose of avoiding the formation of ferric oxide, magnetite, which has a density that is so similar to copper sulfide that the magnetite would go with the copper in the matte which forms below the slag and must be separated therefrom. The proper amount of sulfur, and also a sufficient amount of carbon present during the smelting step, resists the formation of magnetite and also reduces any magnetite which does form to the ferrous form, whose density is sufficiently less than the density of copper and of copper sulfide that the ferrous form goes with the slag for the most part, all as well-known in the smelting art. The matte is then subjected to the converter step in which oxygen is blown through it in order to drive off the sulfides and upgrade the metallic copper present in the matte. In the case of copper smelting, alumina and magnesium oxide are desirable additives during the smelting step in order to reduce the viscosity of the slag which forms above the matte so as to make it easier for the copper values to settle out into the matte.

The prior art teaches the broad concept of encapsulation to dispose of metal values or other hazardous waste, for instance occluding metal values in precipitated complex silicate molecules formed by lime and gypsum as suggested in Krofchak U.S. Pat. No. 4,110,212. Other forms of encapsulation have employed tar, asphalt, and even specially made glass matrix materials, for instance as taught in Kaufmann U.S. Pat. No. 4,202,792 wherein nuclear waste is disposed of by encapsulation, although the glass matrix is not formed incident to smelting.

An article available from the Ontario Ministry of the Environment, Polution Control Branch, Toronto, Canada M4V 1P5 entitled "Recycling of Incineration Ash," Research Report 19 (1975) Diosady, also suggests at page viii lines 1 to 5, that encapsulation of sewage waste metal values incident to incineration of the waste might be beneficial.

Markels U.S. Pat. No. 4,033,763 suggests the addition of sewage sludge which has been dried but not incinerated to the ore in a smelter for the purpose of replacing some of the coke reducing agent therein and acting as a fuel. In addition, British Pat. No. 1,396,205, published on June 4, 1975, and listing Hiramie Theodore McAdams as the inventor, has a paragraph beginning at line 46 and extending through line 54 discussing the concept of adding sewage sludge to serve as at least part of the fuel in a sintering process, including mixing the sludge with iron ore particles to be sintered and heating the mixture sufficiently to cause combustion of the sludge which forms part of the fuel in the process. However, in this sintering process, since water is normally required, it is unnecessary to fully dry the sewage sludge before introducing it to the sinter bed as a fuel, as stated at lines 76 through 79 of that patent.

In a January 1971 report, BNWL-1541, the Battelle Memorial Institute, Pacific Northwest Laboratories, Richland, Wash., teaches a phosphate glass process for the continuous conversion of high level radioactive wastes into a glass encapsulated mass after studies were made to determine the most satisfactory glass. This is not a smelting type of process, but instead concentrates an aqueous waste at low temperatures around 130° C. while adding phosphoric acid and certain other metal salts to form a thick slurry, followed by a high temperature glass forming step (1000° to 1200° C.), the glass being cooled to a monolithic solid containing the non-volatilized wastes.

The Invention

The present invention teaches the combining of an intermediate product derived from a sewage or industrial sludge with the ore in a smelting process to achieve metal value encapsulation, and certain benefits to the smelting process itself. Of course, raw sludge cannot be added since it is too wet, but an intermediate product can be derived from the sludge which comprises a dewatered or dried sludge, or which may comprise an incinerated ash. Where the smelting process includes a preliminary roasting step, dewatered sludge can be dried using waste heat from the preliminary roasting step, and the dried sludge can be added to the ore being roasted so that its organic matter is burned off at the same time part of the sulfur is burned off from the ore. On the other hand, if an incinerated ash of the sludge is available for use, such ash may be added either to the ore during the roasting step or subsequently during the main smelting step. A dried inorganic industrial-process sludge can of course be similarly added. Such a sludge might also be upgraded from the detoxification viewpoint by the roasting process driving off components thereof or changing them into a different form, depending upon the content of the sludge being added. The smelting process then proceeds in the usual manner, generally resulting in a matte separable from a slag, the slag then being drawn off and hardened while the matte is subjected to a further metal winning process steps to recover the principal metal of the ore, and in cases where precious metals are present in the sludge, to separate the precious metals contained in the matte and recover them. The slag contains most of the base metals except for relatively small quantities thereof which appear in the matte and which are eliminated by said further metal winning steps. The slag is allowed to harden, and is generally broken into granular form which can then be safely disposed of since it is non-leachable in rainwater. Such slag is often used in road building, and in other processes in which a filler is required, although it can be also subjected to further metal recovery processes to recover occluded metals therefrom. Most sludges contain a high proportion of phosphorus, and this phosphorus may be highly beneficial to the formation of a particularly desirable glass-like slag for the purpose of encapsulating the hazardous metal values.

Objects and Advantages Of The Invention

It is the principle object of this invention to provide an improved method of safely disposing of sludge containing metal values exhibiting toxic ecological properties, by encapsulating the metal values in a slag formed incident to a smelting process.

It is another major object of the invention to accomplish the encapsulation of metal values in such a slag without requiring the use of any additional energy beyond the energy employed in the smelting operation, wherby the large amount of energy normally used for incinerating sludge, or otherwise treating it, is eliminated.

Still aother object of the invention is to provide an improved process in which the sludge or ash added to the smelter brings to it highly desirable components which appear already in the sludge and which would otherwise have to be added to the ore being smelted, such as refluxing agents, carbonaceous reducing agents, and slag improving phosphates.

Another object of the invention is to dispose of sewage sludge, or the ash derived therefrom, in a process which is already being performed at a temperature higher than the temperature required to form stable glass-like matrices which are not water soluble and which are only formed at temperatures in excess of about 775° C.

It is another important object of the invention to provide a process in which a wet sludge can be dried, using waste heat from the roasting step of the smelting process, prior to addition of the sludge to the ore being roasted.

Another major object of the invention is to provide a combined process in which a sludge product is added to a smelter, wherein the adding thereof introduces a quantity of phosphate sufficient to improve the density and stability of the slag viewed as a glass matrix, and especially improving the non-leachable characteristics of the slag when exposed to water.

Still another object of the invention is to provide a metal-values encapsulation process in which a sludge product is added during the smelting of a metal such as copper, zinc, lead, tin or chromium, whereby precious metal values in the sludge will be dissolved in the matte, or skim which is formed incident to the smelting step, and whereby these precious metal values can then be separated from the base metal and greatly concentrated to make their recovery easier during subsequent metal winning steps in which the matte is further refined. The smelting of copper or zinc need not always proceed to a refinery to extract the precious metals. In the event the ore is relatively free of other metals, the matte containing traces of precious metals can be considered an alloy with some improved physical or electrical properties without further refining or precious metal separation. This becomes an end product unto itself. For example, copper alloys are made with zinc, lead and nickel, and may also include precious metals such as silver and rhodium to enhance their charcteristics. As another example, specialty ferrochromes are made by smelting scrap metal containing various amounts of chrome. The types of alloys for each metal are of course numerous, and this fact points to the usefulness of those sludges that do not contain precious metals in recoverable concentrations, or where the end product is an alloy of one or several metals.

Still another major object of the invention is to provide a very energy-efficient way of disposing of sludge or sludge ash and the metal values therein, while at the same time meeting environmental disposal requirements.

Other objects and advantages of the invention will become apparent during the following discussion of the drawings.

THE DRAWINGS

Figures 1, 3:
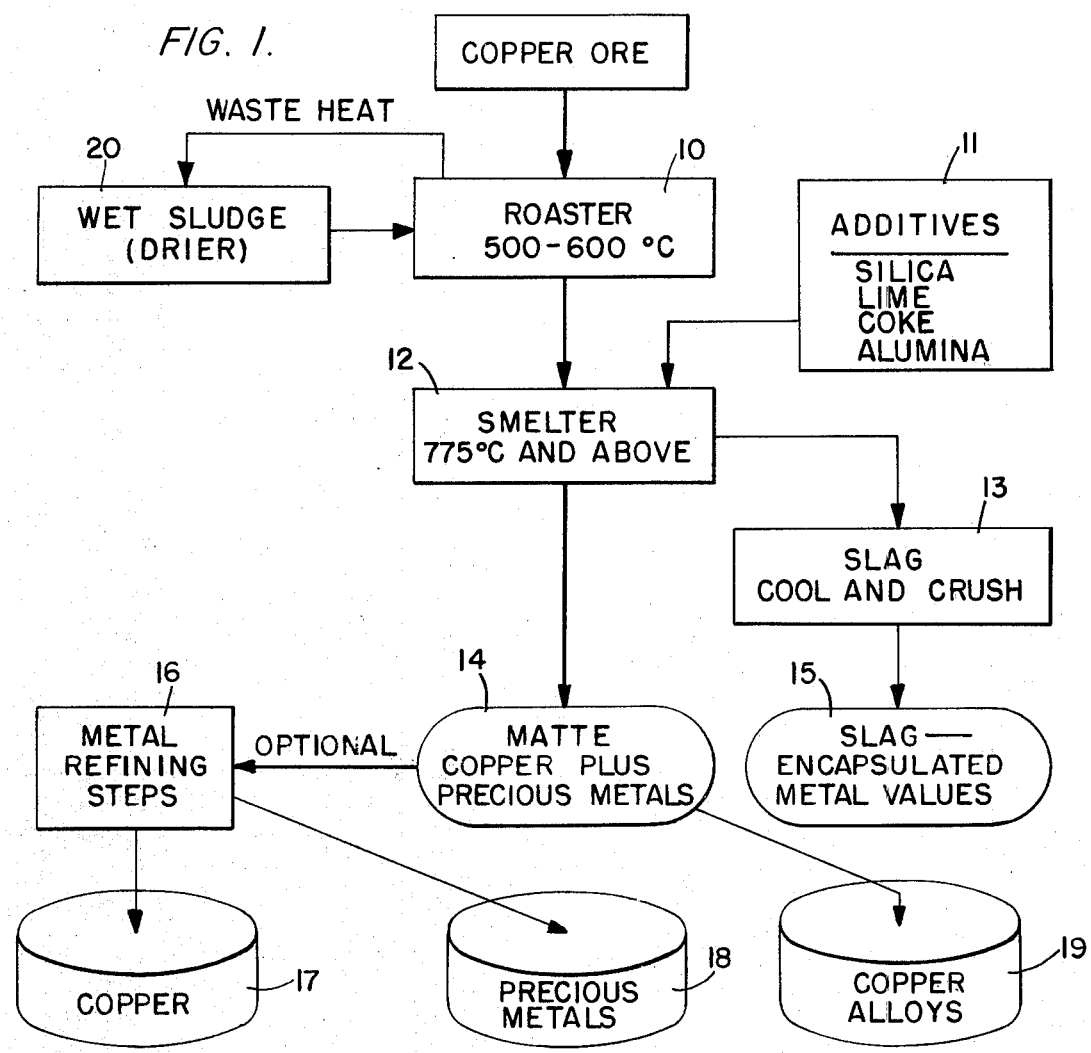
FIG. 1 is a block diagram showing the addition of wet sludge to a smelting process.
FIG. 3 is a table showing typical quantities of metal values found in a copper ore.

Referring now to FIG. 1, this illustrative embodiment of the invention is discussed with reference to a conventional smelting operation for the recovery of copper from a silicic copper ore, the conventional smelting operation having wet sewage sludge added thereto for the reasons set forth above. The copper smelting operation is usually a three step process, including a roasting step represented by the box 10, a smelting step represented by the box 12 and one of several further metal winning refining steps represented by the box 16. It is the purpose of the conventional roasting step 10 to heat the copper ore into a temperature range of 500° to 600° C. for driving off some of the sulfur in the ore, which escapes during the roasting step as sulfur dioxide or as hydrogen sulfide gas, the duration of this step being determined either visually by an experienced operator, or else after suitable tests to estimate the over-all content of sulfur in the ore thereby to determine the roasting time required to adjust its content. This roasting step 10 also achieves a degree of calcining of the ore by changing calcium carbonate to calcium oxide.

The roasted ore then has its fluxing agent content adjusted, generally by adding silica and/or lime as represented in the box 11. Thereafter the ore is smelted at a temperature of 1100° to 1200° C., the temperature being carefully controlled so as to avoid the formation of magnetite, ferric oxide, whose density is so similar to copper sulfide that formed magnetite tends to end up in the copper matte, rather than in the slag. By keeping the temperature within the above range, magnetite has a reduced tendency to form, and the iron remains as ferrous oxide which has a lesser density than copper sulfide and therefore goes into the slag. This hazard is greatest in copper smelting, and tends not to occur in the case of smelting of lead or nickel or zinc, etc. Ordinarily another of the additives represented by the box 11 is coke which helps reduce magnetite to a ferrous form so as to keep the iron in the slag. At the end of the smelting step 12 the slag is poured off and cooled as represented by the box 13 leaving a copper matte which is represented by the box 14 and which also contains any precious metal values such as gold, silver or platinum which tend to alloy with the copper. The cooled slag ends up as a glass-like mass represented by the box 15 in which the base metal values from the process remain encapsulated.

The copper matte from the box 14 can as an option then proceed through selected metal winning steps which are generally represented by the box 16. These steps, for instance, include the blowing of oxygen through the matte to drive off remaining sulfides, this being popularly called the converter step. This step recovers a somewhat more pure copper which can be taken as an alloy as shown in box 19, or alternatively can be asdjusted to additional refining steps as may be necessary to purify the copper. For instance, conventional electrolytic plating steps can be used to recover copper or any of the desired precious metals which may be present.

Another one of the fluxing agents added at the box 11 can be alumina or magnesium oxide which have the effect of reducing the viscosity of the slag so as to make it easier for the copper values to settle out into the matte.

This general copper smelting process also forms the basis of the process shown in FIG. 2 which will be discussed hereinafter. This copper smelting process, and other smelting processes which can be used as a part of the present disclosure such as lead, zinc, tin, nickel, or even iron, etc. comprise standard steps which are well-known in the prior art and are not per se inventive.

FIG. 1 includes such well-known smelting process steps, but adds additional steps which when combined with the smelting steps do produce novel results. Whereas in FIG. 1 wet or dried organic sludge is added to the smelting process, in FIG. 2 an incinerated ash from either organic or inorgaic sludge is added to the charge of ore.

When an organic sludge is to be added as is the case in FIG. 1, it is necessary to dry the sludge before including it in the roasting process. This is conveniently done by adding the wet sludge to the roaster step 10 after drying the sludge in a drying step 20 using waste heat from the roaster 10 to achieve the drying. When the wet sludge has been dried, it can then be added to the roaster along with the copper ore, dried organic matter in the sludge then serving as a reducing agent in the roaster. During roasting the organic values in the sludge are effectively incinerated as part of that step, thereby eliminating the necessity to preincinerate the ash, while at the same time eliminating the energy which would be necessary to accomplish this purpose.

FIG. 3 shows the results of analyzing a typical copper ore and the slag formed after smelting the ore, but without the addition of any sludge occluded values thereto. According to this invention, all of the metal values which have been imbibed and occluded in the organic matter of the sludge are introduced in the roaster along with such silica, alumina, lime and potassium as may have been included in the sludge. FIG. 4 shows a table of metal values found in the incinerated sludge of five different communities shown in five horizontal rows. The metal values are shown as percentages by weight of the ash, with gold and silver appearing as traces in quantities varying from zero to 100 troy ounces per ton. Many of these additives are of value to the smelting process per se. Moreover, the metal values in the sludge can be taken from an industrial process not involving an organic sludge. FIG. 5 shows a table of typical percentages of metal values obtained by analysis of the waste sludge taken from two different semiconductor manufacturers, i.e. from their electroplating processes. The gold content was 3 to 5 troy ounces per ton, and the silver content was 70 to 200 troy ounces per ton.

As stated above, it is common to add silica and lime as fluxing agents to the metal ore in the absence of the inclusion of a sludge product for purposes well-known in the prior art, and it is also common to add coke and aluminum and magnesium values to reduce the viscosity of the slag. Since a sewage sludge contains large amounts of silica, lime and alumina, and some magnesium, the ore smelting process is benefited by its addition. It is not generally recognized that there is advantage in adding phosphates to the smelter step 12 in order to improve the quality of the glass-like slag matrix for purposes of encapsulation. In view of the fact that the main object of the present process is to use the glass-matrix of the slag for the purpose of encapsulating heavy metal values and maintaining them occluded in non-leachable form, the phosphate addition is quite important. Ash can contain a high proportion of phosphate as shown in Markels U.S. Pat. No. 4,033,763, column 7, line 42, listing 20%.

Figures 2, 4, 5:
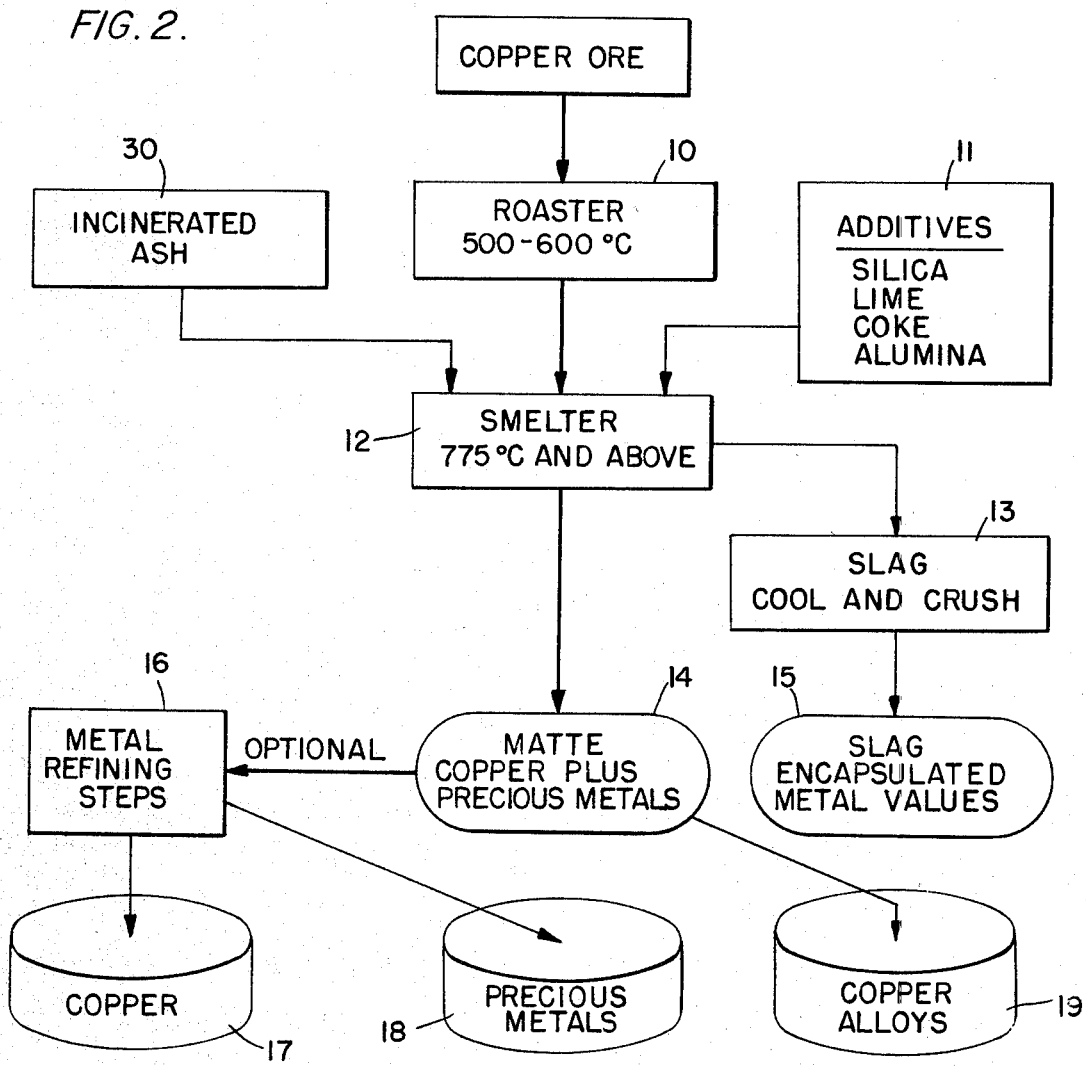
FIG. 2 is a block diagram similar to FIG. 1 but showing the addition of an incinerated sludge ash to a smelting process.
FIG. 4 is a table showing the results of analyses of incinerated ash resulting from the incineration of sewage sludge taken from five different communities shown in separate rows.
FIG. 5 is a table showing the results of analyses of two different industrial plating process sludges.

It is difficult to talk about the exact content of a sludge, because the content varies from day-to-day in sludge from the same source, and because the content of a sludge varies widely when comparing sludge from one area with that from another as shown in FIG. 4. However, most of the sludge from sewage disposal systems contains a high percentage of phosphate and silica, and also contains a large quantity of lime, which is generally added in the sewage disposal plant before the sludge is removed therefrom. Alumina is also a common ingredient along with other base metals. Moreover, as discussed in the above mentioned Markels U.S. Pat. No. 4,033,763, in many locations there is a substantial trace of at least one precious metal, and these precious metals can be recovered incident to the smelting of copper, lead or zinc ore since the precious metal values dissolve in the copper, lead or zinc being recovered and can later be separated therefrom by various processes including those discussed in the Markels patent.

Thus, both the sludge disposal process and the metal winning smelting process are materially aided by the combination of the two, and there appears to be no deleterious effect on the smelting process as a result of introducing the sludge product thereto.

FIG. 2 shows a process similar to FIG. 1 except that sewage sludge is not being added to the roasting step 10, but instead incinerated ash is being added to the smelting step 12. The steps 10, 11, 12, 13, 14, 15, 16, 17, 18, and 19 shown in FIG. 2 are similar to those in FIG. 1, but in FIG. 2 an incinerated ash, or a dried industrial sludge containing virtually no organic matter, is added to the smelter at box 20 along with the fluxing agents, box 11. As far as the smelting step 12 is concerned, it makes little difference whether incinerated ash is added to the smelter along with the ore from the roaster step 10, or whether it is added separately in the smelting step 12. The effect is the same, since the added incinerated ash also contains the silica, lime, aluminum and magnesium values, and phosphates together with any precious metal values and other base metal values. As in the process of FIG. 1, the smelting step delivers a slag in box 13 which encapsulates the base metal values as shown in the box 15. The smelter also delivers the copper matte which may contain any precious metal values introduced by the sludge product, the copper matte from the box 14 being then subjected to the converter step and such other refining steps as are desired. Generally the metal values introduced to the smelter by the sludge product are only a small proportion by weight of the total metal values appearing in the copper ore. As to the proportion of sludge which can be added into the roasting step 10 in FIG. 1, or as to the proportion of incinerated ash or dried industrial sludge which can be introduced into the smelting step 12 in FIG. 2, it would appear that about 2 parts ash to 5 parts ore would be satisfactory, although a more accurate proportioning in a practical situation would be made after analysis of the contents of a particular ash and a particular ore to determine what additives to the ore are needed to optimize its content for smelting. In the event that a dewatered sludge is to be added instead of incinerated ash, the proportion of sludge to ore would be closer to 4:5 since the sludge would be about 50% water and burnable organic matter.

The resulting slag not only encapsulates metals which are considered less than hazardous to the environment, but also encapsulates the more hazardous metals such as hexavalent chromium, cadmium, nickel, arsenic, and to a lesser extent lead and mercury which tend to be vaporized during the roasting and smelting process steps. Where significant quantities of precious metals are included in the sludge, it is particularly advantageous to employ a copper, lead, zinc, nickel or tin smelting process because the precious metals go with the matte and are dissolved in the recovered copper, lead or zinc from which they are relatively easily separated, rather than going with the slag. In the event that no precious metal values are present in the sludge, then it becomes satisfactory to combine the sludge encapsulating process with other smelting processes as well, for instance chromium and iron, since the only purpose of the process, from the sludge disposal point of view is to burn off the organic matter and encapsulate the metal values in the slag in an energy efficient manner. The present process is particularly advantageous from the smelting point of view, since the resulting ash in the smelter adds silica, lime and alumina and other fluxing reagents which must otherwise be separately purchased and added to the smelter, and because the phosphates in the ash improve the glass-like quality of the slag and make it a better encapsulating agent.

This invention is not to be limited to the exact processes shown and described, for variations may be made within the scope of the following claims.

We claim:

1. The method of safely disposing of sludge containing metal values capable of having toxic ecological properties, including the steps of,
   (a) mixing a charge of metal bearing ore with a reducing agent, and roasting it to drive off some of the sulfur components;
   (b) drying a quantity of sludge using heat from the roasting step to produce an intermediate product containing said metal values;
   (c) smelting the roasted charge of metal bearing ore in a furnace;
   (d) mixing with the smelting charge as a reducing agent said intermediate product derived from the sludge and containing said metal values;
   (e) maintaining the smelting temperature of the mixture above 775° C.;

(f) separating the mixture into a matte containing said metal and a slag containing said metal values; and (g) cooling the slag with said metal values encapsulated therein.

2. The method as claimed in claim 1, wherein the sludge dried by said roasting heat is an organic sludge.

3. The method as claimed in claim 1, wherein the sludge dried by said roasting heat comprises sewage sludge.

4. The method as claimed in claim 1, wherein the sludge dried by said roasting heat comprises an industrial process sludge.

5. The method as claimed in claim 1, wherein said ore consists of an ore of one of the metals taken from the following group: copper, lead, zinc, nickel, tin, iron and aluminum.

6. The method as claimed in claim 1, wherein the ore comprises copper ore, and the metal values include at least one precious metal, said precious metal values going with the copper which is separated from the base metal values which remain in the slag; and the method further including metal winning steps by which the precious metal values are recovered from the copper.

7. The method as claimed in claim 1, wherein the ore comprises lead ore, and the metal values include at least one precious metal, said precious metal values dissolving in the lead; and the method further including metal winning steps to recover the precious metals from the lead.

8. The method as claimed in claim 1, wherein the ore comprises zinc ore, and the metal values include at least one precious metal, said precious metal values dissolving in the zinc; and the method further including metal winning steps to recover the precious metals from the zinc.

9. The method as claimed in claim 1, wherein the ore comprises tin ore, and the metal values include at least one precious metal, said precious metal values dissolving in the tin; and the method further including metal winning steps to recover the precious metals from the tin.

10. The method as claimed in claim 1, wherein the ore comprises nickel ore, and the metal values include at least one precious metal, said precious metal values dissolving in the nickel; and the method further including metal winning steps to recover the precious metals from the nickel.

* * * * *